(12) United States Patent
Dubinsky

(10) Patent No.: US 8,022,819 B2
(45) Date of Patent: Sep. 20, 2011

(54) ELECTRONIC CONTROL APPARATUS AND METHOD FOR CONTROLLING ALARM SYSTEMS OF CELLULAR STRUCTURE

(75) Inventor: William J. Dubinsky, Hoboken, NJ (US)

(73) Assignee: Swiss Reinsurance Company, Zurich (CH)

( * ) Notice: Subject to any disclaimer, the term of this patent is extended or adjusted under 35 U.S.C. 154(b) by 816 days.

(21) Appl. No.: 12/047,916

(22) Filed: Mar. 13, 2008

(65) Prior Publication Data
US 2009/0054079 A1 Feb. 26, 2009

(51) Int. Cl.
- *B60Q 1/00* (2006.01)
- *G05B 19/18* (2006.01)
- *G05B 11/01* (2006.01)
- *G05B 9/02* (2006.01)
- *G06Q 40/00* (2006.01)
- *G07B 17/00* (2006.01)

(52) U.S. Cl. ........ 340/438; 700/4; 700/21; 700/79; 705/4; 705/30; 705/41

(58) Field of Classification Search .......... 340/438; 700/32, 49, 99, 100, 102, 104, 121; 705/4, 705/8, 7, 41, 30; 307/116
See application file for complete search history.

(56) References Cited

U.S. PATENT DOCUMENTS

| | | | |
|---|---|---|---|
| 2006/0173720 A1* | 8/2006 | Berens et al. | 705/4 |
| 2008/0164769 A1* | 7/2008 | Eck | 307/116 |
| 2009/0063236 A1* | 3/2009 | Pennay | 705/8 |
| 2009/0115588 A1* | 5/2009 | Stahel et al. | 340/438 |
| 2009/0171480 A1* | 7/2009 | Weber | 700/79 |
| 2009/0307012 A1* | 12/2009 | Delavy et al. | 705/4 |

* cited by examiner

*Primary Examiner* — Brian A Zimmerman
*Assistant Examiner* — Mirza Alam
(74) *Attorney, Agent, or Firm* — Oblon, Spivak, McClelland, Maier & Neustadt, L.L.P.

(57) ABSTRACT

Electronic control apparatus (20) and method for controlling cellular alarm systems (10/11), wherein, by means of sensors (201) of the control apparatus (20), physical measurement parameters (202) of occurring measurement events (203) are triggered and are filtered on the basis of predefined threshold values (204). The alarm systems (10/11) are selected and activated electronically if at least one of the threshold values (204) is exceeded. For the purpose of activation, dedicated activation signals (101) are generated by means of the control apparatus (20) and transmitted to the alarm systems (10/11). By means of a counter module (21) of the control apparatus (20), the generated activation signals (101) are cumulated, as a counter signal (211), within a predefined time window (205) upon each activation. After expiry of the time window (205), the cumulated counter signal (211) is weighted dynamically on the basis of geographical location parameters (2021) and physical measurement parameters (2022) of the measurement parameters (211) by means of a topographical grid (31), and stored in a grid-based topographical lookup table (25). The activation signals (101) transmitted to the alarm systems (10/11) are generated in a grid-cell-wise graduated manner on the basis of the dynamic lookup table elements (251) the alarm systems (10/11) activated accordingly.

18 Claims, 1 Drawing Sheet

Figure 1:
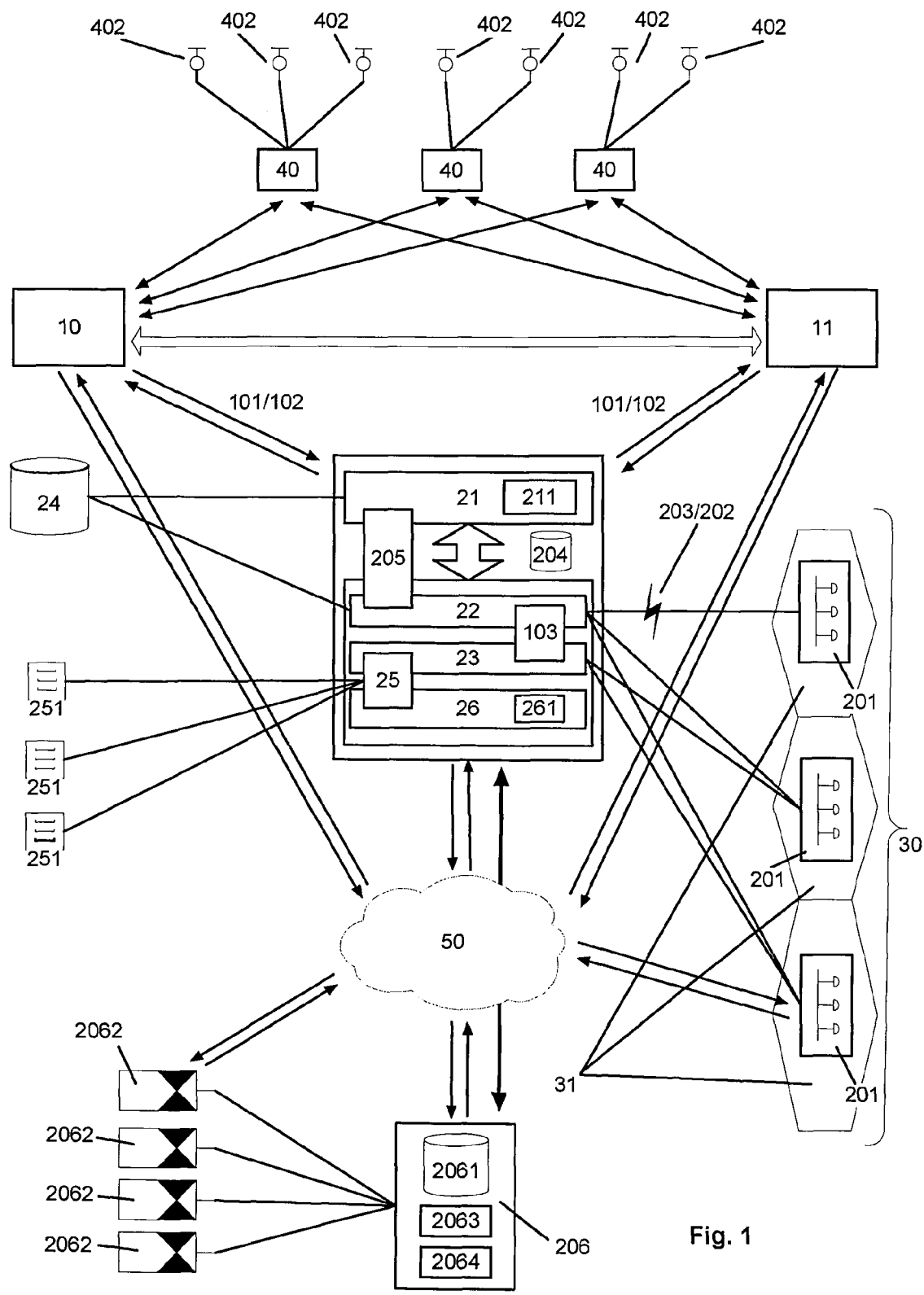

ELECTRONIC CONTROL APPARATUS AND METHOD FOR CONTROLLING ALARM SYSTEMS OF CELLULAR STRUCTURE

The invention relates to an electronic control apparatus and to a method for controlling cellular alarm systems wherein, by means of sensors of the control apparatus, physical measurement parameters of occurring measurement events are triggered and are filtered on the basis of predefined threshold values. The alarm systems are selected and activated electronically if at least one of the threshold values is exceeded. For the purpose of activation, by means of the control apparatus dedicated activation signals are generated and transmitted to the alarm systems.

PRIOR ART

Many sectors of industry and technology at present, only partial technical solutions can be realized, owing to the complexity of the technical applications. In the case of differentiated signal generation, in particular, human interaction remains a necessary prerequisite in many sectors of industry, technology and science as soon as the complexity of the apparatuses involved, of the acquired measurement parameters or of the processes and interactions with the environment that are to be controlled exceeds a certain measure. Thus, for example, in the case of the control, checking and monitoring of dynamic and/or non-linear processes, automation is frequently beyond the scope of the prior art. Only in very rare cases can non-linear processes, especially high-level processes, be accommodated in a technically satisfactory manner by conventional apparatuses. At present, many technical realizations of very differing types of early-warning apparatuses, image and/or pattern recognition apparatuses, particularly in the case of analog measurement data or in the case of requisite self-organization of the apparatus, have not yet been achieved in the prior art. Most natural processes have, at least in part, a non-linear course and, outside a narrow linear range of equilibrium, tend towards exponential behaviour. Efficient and reliably functioning early-warning signal generation and automated operational disturbance rectification can therefore be important for the survival of many of these technical installations. This extends from complex technical apparatuses such as aircraft, robots and fabrication lines, etc., each having many thousands of sensors and measurement signals, to monitoring and control systems based on environmental influences that cannot be controlled, such as meteorological (storms, hurricanes, floods), geological (earthquakes) and economic (stock exchange) influences. In the sensitive dynamics of the current markets, it is scarcely possible any longer for industry and commerce, particularly large-scale industry, to autonomously stabilize the effects of operational failures or operational limitations of individual key apparatuses, of entire installations or, also, of external influences such as environmental influences, floods, hurricanes, earthquakes, terrorist attacks, etc. Famous examples of this that may be mentioned are, for example, the failure of a memory-chip production installation in Japan/Korea in the Nineties, with its entire consequential effect upon the associated manufacturers and markets, or the effects of catastrophes and failures, due to war, of transport equipment and conveying equipment in the oil industry. The roots of this phenomenon are to be found, on the one hand, in the globalization of the markets with a global, dynamic competition, in which production locations, products, workforces, etc. can be shifted rapidly and, on the other hand, in the ever shorter production cycles in many sectors. In addition, correlations of instability effects can be intensified to a large extent by the ever more widespread stock-market coding of large companies. The capital bound up in the international finance markets is immense, and follows its own dynamics, which are only partially correlated to the rest of the market and are not easily triggered. These causes combine with the fact that, at present, larger operational failures or operational limitations in many industrial sectors can scarcely any longer be brought under control without differentiated checking systems and/or alarm deployment systems and/or operational intervention systems cooperating. Alarm systems can be based on entirely differing principles. Thus, for example, in the case of an actual operation or production, they can take corrective action directly in an automated or partially automated manner for particular cases, in particular they can take over, redirect or otherwise replace the technical operation of the installation. This can, for example, through the use of substitute equipment (such as, for example, on the large freight ships, through the activation/deactivation of substitute drive equipment, activation/deactivation of emergency electric power generating sets, cooling systems, support systems, with regard to the energy consumption, etc., etc.). One of the basic problems of all of these systems is that automations and/or automated controls of the alarm systems are themselves usually highly unstable and susceptible to faults. One of the causes is the great complexity of the events that occur (hurricanes, earthquakes, etc.) and the complexity of the associated technical installations and their interaction with the environment. Serial failures and/or correlated operational failures or disturbances, e.g. owing to environmental influences, are difficult to detect in advance, or cannot be so detected at all. Thus, huge amounts of resources, in respect of workforces and time expenditure, are still being expended at present, both in the acquisition and checking of the measurement parameters and in the control and checking of the alarm systems. Owing to the lack of automation, the systems usually also lack the speed necessary to enable them to respond to changed conditions. It is likewise difficult to assess the behaviour of the systems since, without automation, it is seldom possible for identical behaviour to be reproduced, and it is precisely in chaotic systems that very small changes can have major effects. This makes the systems of the prior art susceptible and difficult to check.

By contrast, retrospective analysis means are known in the prior art in a very great variety of forms. They cannot be used in the case of alarm systems, however, since they are static or can only be considered retroactively. Such analysis aids include, for example, the so-termed Industry Index Trigger, which index is incremented in a weighted manner by means of defined or fixed weighting parameters for different geographical units and branches of industry. The corresponding index value is generated by an index provider (such as, for example, PCS in the USA) and is also referred to as the so-termed Fix-Weight Industry Index Trigger or FII trigger. It offers some technical improvements in comparison with the Basic Industry Index Trigger, which is also known in the prior art, and can serve as an alternative to a Modeled Loss Trigger. The Modeled Loss Trigger and the FII Trigger cover opposing basic risks: (a) the FII Trigger does not take account of differences in the market shares per event and geographical unit, i.e. it ignores known parameters concerning contractual or otherwise defined intervention provisions (policy terms), inuring covers and the so-termed underwriting criteria in a particular state (such as, for example, legal stipulations); and (b) Modeled Loss Trigger: links the leading or market-dominating companies to uncertainties, secondary to the industry level, that are not present in the FII Trigger. The optimal trigger should probably lie between these two extremes, depending on the corresponding assignment. Such static analysis means, however, cannot be instrumental in automation of the control of alarm systems in the affected sectors, but at most offer a preceding aid for the design of such alarm systems.

TECHNICAL OBJECT

It is an object of this invention to propose an electronic control apparatus and a corresponding method for controlling alarm systems of cellular structure, which apparatus and method do not have the above-mentioned disadvantages. In particular, it is to be a solution which, upon triggering of a predefined measurement event, by means of the control apparatus, allows dedicated control signals to be generated for measurement-event-specific selected alarm systems and allows operational disturbances generated by the measurement event to be rectified in an automated manner by means of the alarm systems in the case of operating apparatuses in an automated manner. In particular, it is to be a solution which allows the control of such alarm systems to be automated without the systems losing stability. At the same time, the system is to have advantages in speed and savings in time expenditure, etc., as a result of the automation.

According to the present invention, this object is achieved, in particular, by the elements of the independent claims. Further advantageous embodiments are additionally disclosed by the dependent claims and the description.

In particular, these objects are achieved by the invention in that, for the purpose of electronically controlling cellular alarm systems, physical measurement parameters of occurring measurement events are triggered and are filtered on the basis of predefined threshold values by means of sensors of a control apparatus, and wherein the alarm systems are selected and activated electronically by means of the control apparatus if at least one corresponding threshold value of a measurement event is exceeded, and wherein for the purpose of activation by means of the control apparatus dedicated activation signals are generated and transmitted to the respective alarm systems; activation parameters of the activation signals generated by the control apparatus are cumulated by means of a counter module of the control apparatus within a predefined time window upon each activation and are stored, as a counter signal, in a memory unit of the control apparatus, each activation signal comprising at least one activation parameter corresponding to the extent of the activation of the corresponding alarm system; associated activation index parameters are determined by means of a Monte Carlo module on the basis of the cumulated counter signal in combination with the geographical distribution of the alarm systems within the region monitored by means of the control apparatus and the associated sensors, which activation index parameters comprise at least one location-independent mean activation of the alarm systems in the region; the measurement parameters of the measurement event comprise geographical location parameters and physical measurement parameters, the activation index parameters being weighted dynamically by means of a filter module, after expiry of the time window, on the basis of the geographical location parameters and physical measurement parameters by means of a topographical grid of the monitored region and being stored in a grid-based, topographical lookup table, the measurement parameters being propagated, by means of an extrapolation module of the control apparatus, on the basis of stored modelled event functions for the purpose of dynamic weighting; and the activation signals transmitted to the alarm systems are generated in a grid-cell-wise graduated manner on the basis of the dynamic lookup table elements, the respective activation parameters of an activation signal corresponding to the respective dynamic lookup table element. The physical measurement parameters of occurring measurement events can comprise, for example, wind strength and/or temperature parameters and/or air pressure and/or humidity parameters and/or seismic earthquake factors. The control apparatus can comprise, for example, a network interface, the control apparatus being connected to the sensors via the network interface, and the sensors being arranged in cellular, geographically and/or topologically definable units or zones, and geophysical, atmospheric and/or maritime physical measurement parameters being transmitted from the sensors to the control apparatus by means of the network interface. The transmission of the measurement parameters from the sensors to the control apparatus can be effected, for example, periodically and/or upon request of the control apparatus and/or of the sensors. The sensors can comprise, for example, measuring sensors, which are connected to the sensors via an air interface or a hardwired interface or via an interface having contacts. The invention has the advantage, inter alia, that a much greater accuracy and safety is achieved in activation, owing to the dynamic weighting of the lookup table in combination with the other features of the invention. At the same time, the transparency of the system is increased substantially. The sensors can comprise, for example, at least sensors for measuring physical event parameters of an intervention event, the sensors being assigned to a particular region and/or at least one operating apparatus. The invention furthermore has the advantage that it remains completely stable even in the case of full automation, in particular in the case of events having a low statistical occurrence that are difficult to detect. Owing to the dynamic automation, the system adapts rapidly and autonomously to new conditions. This has not been possible hitherto in the prior art. In other words, technical optimization and automation of the functioning of the alarm systems that hitherto have been unknown in the prior art are achieved by the solution according to the invention. The invention furthermore has the advantage, inter alia, that in contrast to the prior art, effective physical measurement quantities can be used dynamically in parallel with modelling results. In particular, it is not necessary, for example, that general parameters of the individual module functions of the extrapolation module also be fixed in advance.

In one embodiment variant, the sensors of the electronic control apparatus comprise measuring apparatuses for detecting operational disturbances of associated operating apparatuses, operational disturbance parameters of the affected operating apparatuses being transmitted to the control apparatus by means of an interface module and the activation signals being additionally generated on the basis of the operational disturbance parameters. This embodiment variant has the advantage, inter alia, that the weighting can be additionally normalized with the operational disturbance parameters. For the purpose of normalization, the weighting can also be based, for example, on the PCS (Property Claim Services) or similar index. In addition, the activation signals can be adapted more precisely, not only in a manner specific to a measurement event, but also in a manner specific to an operating apparatus and/or to an operational disturbance, which substantially improves the efficiency of the automated system. As an embodiment variant, the sensors can comprise means for dynamically detecting and transmitting the physical measurement parameters. This embodiment variant has the advantage, inter alia, that without further help it can react to the most recent events in an automated manner. This can be easily realized, by means of the present electronic control apparatus, as real-time activation.

In another embodiment variant, upon activation of the time window, the control apparatus is enabled to activate the alarm systems only if a stack-memory level value of an associated activation stack memory is attained.

The activation stack memory can, for example, be incremented progressively, before activation of the time window, by means of at least one activation unit associated with a measurement event, the stack-memory level value being decremented within the time window on the basis of the counter signal of the counter module, and consideration parameters, corresponding to the claimed payment, being transmitted to the activation units on the basis of the stack-memory level value, after expiry of the time window. This embodiment variant has the advantage, inter alia, that, in the case of such an activation memory, a reduction of the requisite stack-memory level value can be achieved, which renders the system more competitive and better adapted. In addition, the association permits an additional stabilization of the operation of the alarm systems and of the electronic control apparatus.

In a further embodiment variant, the alarm systems comprise a classification factor, stored in an associated manner, having at least two different activation classes, each alarm system being associated with at least one activation class and the control apparatus changing the activation class of the alarm systems automatically upon the cumulated counter signal of the counter module being exceeded. This embodiment variant has, inter alia, the same advantages as the preceding embodiment. Moreover, the activation signals, or the selected alarm systems, can be more easily adapted to the magnitude and/or the extent of the occurring measurement events. Likewise, the requisite alarm systems can be more easily adapted to the magnitude and/or the extent of the occurring measurement events.

In a further, different embodiment variant, the electronic control apparatus comprises means for the encoded and access-controlled transmission of the activation signals and/or of the activation parameters, a data token being generated for the purpose of decoding the access-controlled activation pulses according to transmitted access request data and being transmitted to the corresponding alarm systems, the data token in each case comprising data which comprise at least parts of a corresponding cipher key to the access-controlled encoded activation signal, or comprising an access authorization to a cipher key for decoding the activation signal. The data token can, for example, be encoded and/or electronically signed. This embodiment variant has the advantage, particularly with decentralized alarm systems and/or operating apparatuses arranged in a network, that the safety of the system can be improved substantially without the need to relinquish the advantage of the network coupling. Quite generally, however, the embodiment variant has the advantage, inter alia, that the apparatus permits a high standard of safety and a technically stable behaviour in the exchange between the systems. As has been mentioned, the data token can be, for example, encoded and/or electronically signed. In particular, the encoding can be performed, for example, via Public Key Cryptography, in particular SSL (secure sockets layer) or HTTPS.

It is to be stated at this point that the present invention, in addition to relating to the method according to the invention, also relates to a system for executing this method.

Embodiment variants of the present invention are described in the following with reference to examples. The examples of the embodiments are illustrated by the following appended figures:

FIG. 1 shows a block diagram which shows, in schematic form, an electronic control apparatus 20 and a corresponding method for controlling cellular alarm systems 10/11 that can be used for realization of the invention. By means of sensors 201 of the control apparatus 20, physical measurement parameters 20) of occurring measurement events 203 are measured and acquired, and filtered on the basis of predefined threshold values 204. The alarm systems 10/11 are selected and activated electronically if at least one of the threshold values 204 is exceeded. For the purpose of activation, dedicated activation signals 101 are generated by means of the control apparatus 20 and transmitted to the alarm systems 10/11. By means of a counter module 21 of the control apparatus 20, the generated activation signals 101 are cumulated, as a counter signal 211, within a predefined time window 205 upon each activation. After expiry of the time window 205, the cumulated counter signal 211 is weighted dynamically on the basis of geographical location parameters 2021 and physical measurement parameters 2022 of the measurement parameters 211 by means of a topographical grid 31, and stored in a grid-based topographical lookup table 25. The activation signals 101 transmitted to the alarm systems 10/11 are generated in a grid-cell-wise graduated manner on the basis of the dynamic lookup table elements 251 the alarm systems 10/11 activated accordingly. FIG. 1 illustrates an architecture that can be used for realizing the authentication of the invention. FIG. 1 shows a block diagram which shows, in schematic form, an electronic control apparatus 20 according to the invention and a corresponding method for electronically controlling cellular alarm systems 10/11. By means of sensors 201 of a control apparatus 20, physical measurement parameters 202 of occurring measurement events 203 are measured and/or triggered, and filtered on the basis of predefined threshold values 204. Measurement events 203 can comprise, for example, external or internal influences, on apparatuses or installations, that can cause a disruption of the operation or other damage. External influences can comprise, for example, earthquakes, conflagrations, tornados or other external influences. Internal influences can comprise, for example, ageing or wear processes. The alarm systems 10/11 are selected and activated electronically by means of the control apparatus 20 if at least one corresponding threshold value 204 of a measurement event 203 is exceeded. The automated alarm systems 10/11 can comprise, for example, automatically activated extinguishing systems, electric power circuit-breaking or emergency generator systems, operation checking systems with automated control and/or alarm apparatuses, signal conversion or relay systems for automated activation of alarms or checking control. The physical measurement parameters 202 of the occurring measurement events 203 can comprise, for example, wind strength and/or temperature parameters and/or air pressure and/or humidity parameters and/or seismic earthquake factors. For the purpose of activation, dedicated activation signals 101 are generated by means of the control apparatus 20 and transmitted to the respective alarm systems 10/11. In an embodiment variant, the sensors 201 of the electronic control apparatus 20 can also comprise, for example, measuring apparatuses 402 for detecting operational disturbances of associated operating apparatuses 40, operational disturbance parameters 401 of the affected operating apparatuses 40 being transmitted to the control apparatus 20 by means of an interface module 2011, and the activation signals 101 being additionally generated on the basis of the operational disturbance parameters 401. As has been mentioned, the physical measurement parameters 202 of the measurement events 203 are detected by means of corresponding sensors 201 and transmitted to the control apparatus 20. The sensors 201 can be arranged so as to be accessible by the control apparatus 20 in a centralized or decentralized manner, e.g. via a network 50. The measurement events 203 can comprise any kind of necessity for alarm and/or operational interventions. Operational interventions be based on any kind of operational disturbance of technical installations or apparatuses, e.g. operational failures, operational limitations or any damage to the operation. Measurement events 203 can comprise, for example, natural events or natural catastrophes such as, for example, earthquakes, floods, droughts, tornados, etc. There can also be measurement events 203 that are caused by terror activities. The measurement events 203 may also, however, be events such as conflagrations, relatively long disruptions of energy supply, or even events arising through one's own fault such as, for example, excessive ageing of the operating apparatuses or improper manipulation or maintenance. The alarm systems 10/11 can be connected unidirectionally or bidirectionally to the electronic control apparatus 20. The connection can be effected via an air-borne and/or land-borne connection, in particular via a fixed connection and/or wirelessly. The sensors 201 can comprise, for example, sensors for measuring speed, temperature and/or fuel or other operating parameters of an operating apparatus 40. The sensors 201 can also comprise, for example, a location acquisition module, by means of which location acquisition module location coordinate parameters of the current location of the measuring apparatus of the sensors 201 or of the operating apparatus 40 are generated and transmitted to the control apparatus 20. In particular, the sensors 201 can also comprise means for acquiring user-specific measurement parameters of an operator of operating apparatuses 10/11 (e.g. blood pressure, alcohol, eye tracking, skin surface tension, blood sugar, heartbeat, etc.). Activation parameters 102 of the activation signals 101 generated by the control apparatus 20 are cumulated by means of a counter module 21 of the control apparatus 20 within a predefined time window 205 upon each activation and are stored, as a cumulated counter signal 211, in a memory unit 24 of the control apparatus 20, each activation signal 101 comprising at least one activation parameter 10/11 corresponding to the extent of the activation of the corresponding alarm system 10/11.

On the basis of the cumulated counter signal 211 in combination with a geographical distribution of the alarm systems 10/11 within the region 30 monitored by means of the control apparatus 20 and the associated sensors 201, associated activation index parameters 103 are determined by means of a Monte Carlo module 22, which activation index parameters 103 comprise at least one location-independent mean activation of the alarm systems 10/11 in the region. The cumulated counter signal 211, or the activation index parameter 103, can also be based, as an embodiment variant, on transmitted parameters of the PCS (Property Claim Services) or a similar public or private index. The measurement parameters 202 of the measurement event 203 comprise geographical location parameters 2021 and physical measurement parameters 2022. The activation index parameter 103 is weighted dynamically by means of a filter module 23, after expiry of the time window 205, on the basis of the geographical location parameters 2021 and physical measurement parameters 2022 by means of a topographical grid 31 of the monitored region 30 and stored in a grid-based, topographical lookup table 25. For the purpose of dynamic weighting, the measurement parameters 202 are propagated and/or extrapolated, by means of an extrapolation module 26 of the control apparatus 20, on the basis of stored modelled event functions 261. The event functions 261 are based on physical models and can be stored accessibly in the control apparatus 20. The selection of a particular event function 261 is performed by the extrapolation module 26, on the basis of the measured measurement parameters 202. Corresponding filter means can be integrated into the extrapolation module 26 or be realized, as hardware and/or at least partially as software, as part of the filter module 23. The control apparatus 20 can comprise, for example, a network interface 207, via which it is connected to the sensors 201. The sensors 201 can be arranged, for example, in cellular, geographically and/or topologically definable units or zones, and geophysical, atmospheric and/or maritime physical measurement parameters 202 can be transmitted from the sensors 201 to the control apparatus 20 by means of the network interface 207. The transmission of the measurement parameters 202 from the sensors 201 to the control apparatus 20 can be effected, for example, periodically and/or upon request of the control apparatus 20 and/or of the sensors 201. The sensors 201 can comprise, inter alia, measuring sensors which are connected to the sensors 201 via an air interface or a hardwired interface or via an interface having contacts. The electronic control apparatus 20 and/or the alarm systems 10/11 can comprise, for example, one or more different physical network interfaces, which can also support various network standards. The physical network interfaces can comprise, for example, interfaces to WLAN (Wireless Local Area Network), Bluetooth, GSM (Global System for Mobile Communications), GPRS (Generalized Packet Radio Service), USSD (Unstructured Supplementary Services Data), UMTS (Universal Mobile Telecommunications System) and/or Ethernet or another wired LAN (Local Area Network), etc. Accordingly the network 50 can represent a variety of heterogeneous networks such as, for example, a Bluetooth network, e.g. for installations in roofed-over locations, a mobile telephony network with GSM and/or UMTS, etc., a wireless LAN, e.g. based on IEEE wireless 802.1x, but also to a wired LAN, i.e. a local fixed network, in particular also the PSTN (Public Switched Telephone Network), etc. It is to be stated in principle that the method and/or the system is/are not bound to a specific network standard, inasmuch as the features according to the invention are present but, if realized via a network 50, can be realized with any LAN. The interfaces can be not only packet-switched interfaces, such as those used directly by network protocols such as, for example, Ethernet or token ring, but also circuit-switched interfaces that can be used by means of protocols such as, for example, PPP (Point-to-Point Protocol), SLIP (Serial Line Internet Protocol) or GPRS (Generalized Packet Radio Service), i.e. which interfaces have, for example, no network address such as a MAC address or DLC address. As has been partially mentioned, the communication can be effected via the LAN, for example by means of special short messages, e.g. SMS (Short Message Services), EMS (Enhanced Message Services), via a signalling channel such as, for example, USSD (Unstructured Supplementary Services Data) or other techniques, such as MExE (Mobile Execution Environment), GPRS (Generalized Packet Radio Service), WAP (Wireless Application Protocol) or UMTS (Universal Mobile Telecommunications System) or via IEEE wireless 802.1x or another data channel.

The activation signals 101 transmitted to the alarm systems 10/11 are generated in a grid-cell-wise graduated manner on the basis of the dynamic lookup table elements 251, the respective activation parameters 102 of an activation signal 101 corresponding to the respective lookup table element 251. Dynamic can mean, in particular, that the alarm systems 10/11 can be activated directly and/or in a fully automated manner by the control apparatus 20, i.e. no interaction of any kind by operators and/or modules/apparatuses is required. In the case of systems based partially on monetary value, the weighting can also comprise, for example, a dynamic market analysis and weighting of the individual operating apparatuses 40 in the market, by means of a corresponding analysis module and/or expert module. Requisite parameters of the market can be taken dynamically, e.g. from official, for example, stock-market, data, etc., or from other databanks, and used for this purpose. Also conceivable as an embodiment variant is that whereby, for example, upon activation or starting of the time window 205, the control apparatus 20 is enabled to activate the alarm systems 10/11 only if a predefined stack-memory level value 2061 of an activation stack memory 206 of the control apparatus 20 is attained. The activation stack memory 206 can, for example, be incremented progressively, before activation of the time window 205, by means of at least one activation unit 2062 associated with a measurement event 203. The stack-memory level value 2061 can be decremented within the time window 205 on the basis of the counter signal 211 of the counter module 21 and, for example, consideration parameters, corresponding to the claimed performance, can be transmitted to the activation units 2062 on the basis of the stack-memory level value 2061, after expiry of the time window 205. The incrementing can be effected, for example, by means of normalized and/or protected and/or transmissible units. The units that can be stored in memory and are protected can also comprise, as an embodiment variant, for example, monetary amount values that can be stored in memory and/or corresponding data tokens. The activation can be effected by the control apparatus 20 itself, e.g. upon transmission of the units to the alarm systems 10/11. It can be appropriate, as an embodiment variant, that means of the activation stack memory 206 control the activation of the control apparatus 20, permitting an additional checking function and additional safety.

As an embodiment variant, the alarm systems 10/11 can comprise a classification factor 2063, stored in an associated manner, having at least two different activation classes 2064. In this exemplary embodiment, each alarm system 10/11 is associated with at least one activation class 2064. The control apparatus 20 changes the activation class 2064 of the alarm systems 10/11 automatically upon the cumulated counter signal 211 of the counter module 21 being exceeded. This is indicated symbolically in FIG. 1 by the reference numerals 10 and 11. Clearly, such differing classes of alarm system can also additionally be autonomously synchronized to each other, as indicated by the connecting arrow in FIG. 1. With this embodiment variant, the activation signals, or the selected alarm systems 10/11, can be more easily adapted to the magnitude and/or the extent of the occurring measurement events. Likewise, the requisite alarm systems can be more easily adapted to the magnitude and/or the extent of the occurring measurement events. In an embodiment variant, in the case of alarm systems 10/11 that are based partially on monetary value and can be activated, data elements that can be stored in memory and are protected, for example, are transmitted to the operating apparatuses 40 or to system units associated therewith, for the purpose of activating the alarm systems 10/11. The data elements can comprise, for example, monetary amount values that can be stored in memory and/or corresponding data tokens. The control apparatus 20, for example upon at least one of the threshold values being exceeded, can transmit to a clearing module, in an automated manner, charging data having charging parameters for crediting and/or debiting of monetary amount values. Likewise, in this exemplary embodiment, the operating apparatuses 40 can be instrumental in incrementing an activation stack memory by means of value-based data tokens. Data tokens can in each case comprise, for example, data which comprise at least parts of a corresponding cipher key to the access-controlled encoded incrementing pulse, or comprise an access authorization to a cipher key for decoding the incrementing pulse. Data tokens can, for example, be encoded and/or electronically signed. The encoding can comprises, for example, via Public Key Cryptography, in particular SSL (secure sockets layer) or HTTPS.

| List of references | | |
|---|---|---|
| 10/11 | Alarm system | |
| | 101 Activation signal | |
| | 102 Activation parameter with activation units | |
| | 103 Activation index parameter | |
| 20 | Electronic control apparatus | |
| | 201 Sensors | |
| |     2011 | Interface |
| | 202 Measurement parameter | |
| |     2021 | Geographical location parameter |
| |     2022 | Physical measurement parameter |
| | 203 Measurement event | |
| | 204 Threshold value | |
| | 205 Time window | |
| | 206 Activation stack memory | |
| |     2061 | Stack memory level value |
| |     2062 | Activation unit |
| |     2063 | Classification factor |
| |     2064 | Activation class |
| | 207 Network interface | |
| 21 | Counter module | |
| | 211 Counter signal | |
| 22 | Monte Carlo module | |
| 23 | Filter module | |
| 24 | Memory unit | |
| 25 | Topographical lookup table | |
| | 251 Lookup table element | |
| 26 | Extrapolation module | |
| | 261 Event functions | |
| 30 | Monitored region | |
| 31 | Topographical grid | |
| 40 | Operating apparatus | |
| | 401 Operational disturbance parameter | |
| | 402 Measuring apparatuses for measuring operational disturbances | |
| 50 | Network | |

The invention claimed is:

1. A method for electronically controlling cellular alarm systems, wherein by means of sensors of a control apparatus, physical measurement parameters of occurring measurement events are triggered and are filtered on the basis of predefined threshold values, and wherein the alarm systems are selected and activated electronically by means of the control apparatus if at least one corresponding threshold value of a measurement event is exceeded, and wherein, for activation, by means of the control apparatus dedicated activation signals are generated and transmitted to the respective alarm systems, wherein activation parameters of the activation signals generated by the control apparatus are cumulated by means of a counter module of the control apparatus within a predefined time window upon each activation and are stored, as a counter signal, in a memory unit of the control apparatus, each activation signal comprising at least one activation parameter corresponding to an extent of the activation of the corresponding alarm system, on the basis of the cumulated counter signal in combination with a geographical distribution of the alarm systems within a region monitored by means of the control apparatus and the associated sensors, associated activation index parameters are determined by means of a Monte Carlo module, which activation index parameters comprise at least one location-independent mean activation of the alarm systems in the region, the measurement parameters of the measurement event comprise geographical location parameters and physical measurement parameters, the activation index parameters being weighted dynamically by means of a filter module, after expiry of the time window, on the basis of the geographical location parameters and physical measurement parameters by means of a topographical grid of the monitored region and being stored in a grid-based, topographical lookup table, the measurement parameters being propagated, by means of an extrapolation module of the control apparatus, on the basis of stored modelled event functions for dynamic weighting, the activation signals transmitted to the alarm systems are generated in a grid-cell-wise graduated manner on the basis of the dynamic lookup table elements, the respective activation parameters of an activation signal corresponding to the respective dynamic lookup table element.

2. The method according to claim 1, wherein the sensors of the electronic control apparatus comprise measuring apparatuses for detecting operational disturbances of associated operating apparatuses, operational disturbance parameters of the affected operating apparatuses being transmitted to the control apparatus by means of an interface module and the activation signals being additionally generated on the basis of the operational disturbance parameters.

3. The method according to claim 1, wherein the physical measurement parameters of the occurring measurement events comprise at least one of wind strength, temperature parameters, air pressure, humidity parameters, or seismic earthquake factors.

4. The method according to claim 1, wherein upon activation of the time window, the control apparatus is enabled to activate the alarm systems only if a predefined stack-memory level value of an activation stack memory of the control apparatus is attained.

5. The method according to claim 4, wherein the activation stack memory be incremented progressively, before activation of the time window, by means of at least one activation unit associated with a measurement event, the stack-memory level value being decremented within the time window on the basis of the counter signal of the counter module, and consideration parameters, being transmitted to the activation units on the basis of the stack-memory level value, after expiry of the time window.

6. The method according to claim 1, wherein the alarm systems comprise a classification factor, stored in an associated manner, having at least two different activation classes, each alarm system being associated with at least one activation class and the control apparatus changing the activation class of the alarm systems automatically upon a cumulated counter signal of the counter module being exceeded.

7. The method according to claim 1, wherein in that the control apparatus comprises a network interface, the control apparatus being connected to the sensors via the network interface, and the sensors being arranged in at least one of cellular, geographically or topologically definable units or zones, and at least one of geophysical, atmospheric or maritime physical measurement parameters being transmitted from the sensors to the control apparatus by means of the network interface.

8. The method according to claim 1, wherein transmission of the measurement parameters from the sensors to the control apparatus is effected at least one of periodically, upon request of the control apparatus, or of the sensors.

9. The method according to claim 1, wherein the sensors comprise measuring sensors, which are connected to the sensors via an air interface or a hardwired interface or via an interface having contacts.

10. An electronic control apparatus for controlling cellular alarm systems, wherein the control apparatus comprises sensors for acquiring physical measurement parameters of occurring measurement events and comprises a filter module for filtering the measurement parameters on the basis of predefined threshold values, the alarm systems being selected and activated electronically by means of the control apparatus if at least one threshold value of a measurement event is exceeded, and the activation being realized on the basis of dedicated activation signals that are generated by means of the control apparatus and transmitted to the respective alarm systems, wherein the control apparatus comprises a counter module, activation parameters of the activation signals generated by the control apparatus being cumulated by means of the counter module within a predefined time window upon each activation and being stored, as a counter signal, in a memory unit of the control apparatus, each activation signal comprising at least one activation parameter corresponding to an extent of the activation of the corresponding alarm system, the control apparatus comprises a Monte Carlo module, associated activation index parameters being determined by means of the Monte Carlo module on the basis of the cumulated counter signal in combination with geographical distribution of the alarm systems within a region monitored by means of the control apparatus and the associated sensors, which activation index parameters comprise at least one location-independent mean activation of the alarm systems in the region, the control apparatus comprises a filter module, the activation index parameters being weighted dynamically by means of the filter module, after expiry of the time window, on the basis of the geographical location parameters and physical measurement parameters by means of a topographical grid of the monitored region and being stored in a grid-based, topographical lookup table, and the measurement parameters being extrapolated, by means of an extrapolation module of the control apparatus, on the basis of stored modelled event functions, for dynamic weighting, and the activation signals transmitted to the alarm systems are generated in a grid-cell-wise graduated manner on the basis of the dynamic lookup table elements (251), the respective activation parameters of an activation signal corresponding to the respective dynamic lookup table element.

11. The electronic control apparatus according to claim 10, wherein the sensors of the electronic control apparatus comprise measuring apparatuses for detecting operational disturbances of associated operating apparatuses, operational disturbance parameters of the affected operating apparatuses being transmitted to the control apparatus by means of an interface module and the activation signals being additionally generated on the basis of the operational disturbance parameters.

12. The electronic control apparatus according to claim 10, wherein the physical measurement parameters of the occurring measurement events comprise at least one of wind strength, temperature parameters, air pressure, humidity parameters, or seismic earthquake factors.

13. The electronic control apparatus according to claim 10, wherein, upon activation of the time window, the control apparatus is enabled to activate the alarm systems only if a stack-memory level value of an activation stack memory of the control apparatus is attained.

14. The electronic control apparatus according to claim 13, wherein the activation stack memory is incremented progressively, before activation of the time window, by means of at least one activation unit associated with a measurement event, the stack-memory level value being decremented within the time window on the basis of the counter signal of the counter module, and consideration parameters, being transmitted to the activation units on the basis of the stack-memory level value, after expiry of the time window.

15. The electronic control apparatus according to claim 10, wherein the alarm systems comprise a classification factor, stored in an associated manner, having at least 2 different activation classes, each alarm system being associated with at least one activation class and the control apparatus changing the activation class of the alarm systems automatically upon a cumulated counter signal of the counter module being exceeded.

16. The electronic control apparatus according to claim 10, wherein the control apparatus comprises a network interface, the control apparatus being connected to the sensors via the network interface, and the sensors being arranged in at least one of cellular, geographically, or topologically definable units or zones, and at least one of geophysical, atmospheric, or maritime physical measurement parameters being transmitted from the sensors to the control apparatus by means of the network interface.

17. The electronic control apparatus according to claim 10, wherein transmission of the measurement parameters from the sensors to the control apparatus is effected at least one of periodically, upon request of the control apparatus, and/or or of the sensors.

18. The electronic control apparatus according to claim 10, wherein the sensors comprise measuring sensors, which are connected to the sensors via an air interface or a hardwired interface or via an interface having contacts.

* * * * *